United States Patent
Uszkoreit et al.

(10) Patent No.: US 9,405,849 B1
(45) Date of Patent: Aug. 2, 2016

(54) INDUCING COMMAND INPUTS FROM PROPERTY SEQUENCES

(71) Applicant: Google Inc., Mountain View, CA (US)

(72) Inventors: Jakob D. Uszkoreit, San Francisco, CA (US); John Blitzer, Mountain View, CA (US); Engin Cinar Sahin, New York, NY (US); Rahul Gupta, Mountain View, CA (US); Dekang Lin, Cupertino, CA (US); Fernando Pereira, Palo Alto, CA (US); Ciprian I. Chelba, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/084,166

(22) Filed: Mar. 29, 2016

Related U.S. Application Data (63) Continuation of application No. 13/926,836, filed on Jun. 25, 2013, now Pat. No. 9,330,195.

(51) Int. Cl.
*G06F 17/00* (2006.01)
*G06F 17/30* (2006.01)

(52) U.S. Cl.
CPC .................... *G06F 17/30899* (2013.01)

(58) Field of Classification Search
CPC .................. G06F 17/30386; G06F 17/30595; G06F 11/1092; G06F 2211/1028; G06F 11/1076
See application file for complete search history.

(56) References Cited

U.S. PATENT DOCUMENTS

| 5,068,850 | A | 11/1991 | Moore |
| 5,212,821 | A | 5/1993 | Gorin et al. |
| 5,797,123 | A | 8/1998 | Chou et al. |
| 2006/0190261 | A1 | 8/2006 | Wang |
| 2012/0290509 | A1 | 11/2012 | Heck et al. |

FOREIGN PATENT DOCUMENTS

| EP | 834862 | 4/1998 |
| WO | 0014727 | 3/2000 |

OTHER PUBLICATIONS

Bonino et al., "Dynamic Optimization of Semantic Annotation Relevance" in Evolutionary Computation CEC2004, Congress on Evolutionary Computation, 2004, pp. 1301-1308.
Chen et al., "Diverse Topic Phrase Extraction from Text Collection" WWW 2006, 9 pages.
Gorin et al., "An Experiment in Spoken Language Acquisition", IEEE Transactions on Speech and Audio Processing, 2 (1)(II), 1994, pp. 224-240.

(Continued)

*Primary Examiner* — Truong Vo
(74) *Attorney, Agent, or Firm* — Fish & Richardson P.C.

(57) ABSTRACT

A method identifies pairs of first and second command inputs from respective user device sessions for which the first and second operation data are indicative of a first operation failure and a second operation success. The first operation data indicate a first operation performed on data from a first resource property in response to the first command input, and the second operation data indicate a second operation performed on data from a second resource property in response to the second command input. They system determines, from the identified pairs of first and second command inputs, command inputs for which a parsing rule that is associated with the second operation is to be generated.

15 Claims, 3 Drawing Sheets

(56) References Cited

OTHER PUBLICATIONS

Gupta et al., "Segmenting Spoken Language Utterances Into Clauses for Semantic Classification" in Automatic Speech Recognition and Understanding (ASRU 2003), 2003 IEEE Workshop, pp. 525-530.

Kawahara et al., "Topic Independent Language Model for Key-Phrase Detection and Verification", Acoustics, Speech, and Signal Processing, 1999, 1999 IEEE International Conference, pp. 685-688.

Krulwich et al., "Learning user information interests through the extraction of semantically significant phrases" AAAI Technology Report SS-96-05, Compilation, pp. 110-112.

Lee et al., "Utterance-Level Latent Topic Transition Modeling for Spoken Documents and its Application in Automatic Summarization" in Acoustics, Speech and Signal Processing (ICASSP), 2012 IEEE International Conference, 2012, pp. 5065-5068. [online] [Retrieved on Jan. 31, 2013], Retrieved from the internet: http://www.cs.cmu.edu/~yvchen/doc/ICASSP12_LTModel.pdf.

Lehuen et al., "A Robust Semantic Parser Designed for Spoken Dialog Systems" in 2010 IEEE Fourth International Conference on Semantic Computing (ICSC), 2010, pp. 52-55.

Tur et al., "Semi-Supervised Learning for Spoken Language Understanding Using Semantic Role Labeling" in Automatic Speech Recognition and Understanding (ASRU 2005), pp. 232-237. [online] [Retrieved on Jan. 31, 2013], Retrieved from the internet: http://www.cs.cmu.edu/~ananlada/SemanticRoleLabelingASRU05.pdf.

Wong et al., "Improvements on a Semi-Automatic Grammar Induction Framework" in IEEE Automatic Speech Recognition and Understanding Workshop, 2001, pp. 288-291 [online] [Retrieved on Jan. 31, 2013], Retrieved from the internet: http://www1.se.cuhk.edu.hk/~hccl/publications/pub/Meng_ASRU2001_NLU.pdf.

Wu et al., "KIP: A Keyphrase Identification Program with Learning Functions" in Proceedings of the International Conference on Information Technology: Coding and Computing (ITCC'04), vol. 2, 5 pages.

Yaman et al., "An Integrative and Discriminative Technique for Spoken Utterance Classification" IEEE Transactions on Audio, Speech, and Language Processing, 16(6), 2008, pp. 1207-1214. [online] [Retrieved on Jan. 31, 2013], Retrieved from the internet: http://www1.icsi.berkeley.edu/~sibel/TASL-SUC.pdf.

INDUCING COMMAND INPUTS FROM PROPERTY SEQUENCES

CROSS-REFERENCE TO RELATED APPLICATIONS

This application is a continuation application of, and claims priority to, U.S. patent application Ser. No. 13/926,836, titled "Inducing Command Inputs from Property Sequences," filed on Jun. 25, 2013. The disclosure of the foregoing application is incorporated herein by reference in its entirety for all purposes.

BACKGROUND

This specification relates to language processing systems.

The Internet provides access to a wide variety of resources for different resource properties. Such resource properties may include different websites, and/or different corpora that respectively provide video resources, image resources, web page resources, flight schedule resources, map resources, etc. Resources and services for each resource property are generally provided by servers or server systems. The resources and services are accessed through uniform resource identifiers (URIs) such as uniform resource locators (URLs).

One resource property that can be used to search the corpora is a search system web site. A search system crawls the Internet and indexes the resources and services in an index (or a set of indexes) for use in searching. A search system can search the resources using different search algorithms, where each algorithm designed for a specific corpus. Additionally, some search systems are configured to perform specific operations for some queries in addition to searching an index for the query. For example, the query "SF to ATL" may provide web pages that are responsive to the query, but may also provide a list of flights from San Francisco to Atlanta. The latter information may be gathered by accessing a service for a flight corpus in response to the query, and thus the user need not navigate to a flight database website and manually query for flights from San Francisco to Atlanta.

Providers of information are striving to provide users with access to this information in an intuitive, fluid manner. One way of providing such access is by speech recognition. Speech recognition and speech processing systems are prevalent in many consumer electronic devices. Many of these electronic devices now utilize speech command processing techniques to invoke and perform particular operations. For example, a user device, such as a smart phone, can process speech commands to perform specified operations that include searching the web, requesting a map, booking flights, and so on. Each of these operations may be carried out by different services on different corpora.

Often users will provide a clear indication of the type of information they need, and a search system can process the information accordingly. Such indications may be from queries that provide a clear expression of the user's informational needs. An example is the query [Map San Francisco to Atlanta]. However, sometimes users may not provide queries that clearly describe an informational need, or a search system may not have yet learned that a particular query should be used to invoke a particular operation. An example of such a query is [route me from San Francisco to Atlanta].

SUMMARY

In general, one innovative aspect of the subject matter described in this specification can be embodied in methods that include the actions of accessing command input logs storing data defining user device sessions; identifying, from the command input logs, user device sessions that each respectively store: a sequence of two or more command inputs, each command input specifying one or more parameter values, and each command input having a respective ordinal position in the sequence, and wherein the sequence includes at least one pair of a first command input that precedes a second command input in ordinal position in the sequence; first operation data indicating a first operation performed on data from a first resource property in response to the first command input; second operation data indicating a second operation performed on data from a second resource property in response to the second command input; identifying pairs of first and second command inputs from respective user device sessions for which the first and second operation data are indicative of a first operation failure and a second operation success; and determining, from the identified pairs of first and second command inputs, command inputs for which a parsing rule that is associated with the second operation is to be generated. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The system identifies command input sequences that are indicative of first operation failure for a first resource property and a second operation success for a second resource property that is different from the first resource property. The command input for the first operation failure may then be processed and associated with the second operation for the second resource property. Thus, by utilizing crowdsourcing techniques from log data, parse rules for command inputs that are most reflective of user behavior are generated for particular actions. Accordingly, new parses for an existing set of parses for a particular action emerge without requiring detailed studies of commands, or generation of additional command inputs by evaluators. This reduces the overall parse model maintenance costs and maintenance time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system accesses command input logs storing data defining user device sessions. From these command input logs, the system identifies user device sessions that each respectively store a sequence of two or more command inputs. For each sequence, each command input specifies one or more parameter values, and each command input has a respective ordinal position in the sequence. Thus, each sequence includes at least one pair of a first command input that precedes a second command input in ordinal position in the sequence.

The command input logs also store first operation data indicating a first operation performed on data from a first resource property in response to the first command input, and second operation data indicating a second operation performed on data from a second resource property in response to the second command input. For example, first operation data may be a query submitted to a search system, and data indicating which, if any of the search results provided in response to the query were selected by a user at a user device. The second operation data may be map locations and a command to provide directions input to a map service web site.

The system identifies pairs of first and second command inputs from respective user device sessions for which the first and second operation data are indicative of a first operation failure and a second operation success. Any appropriate heuristic may be used to determine whether the first and second operation data are indicative of a first operation failure and a second operation success, and example heuristics are described below. The indication of a first operation failure followed by a second operation success is a signal that the first operation at the first resource property did not satisfy users' informational needs, but that the second operation at the second resource property did satisfy users' informational needs. Thus, associating the first command input at the first property with the second operation can facilitate providing information from the second operation when the command input is again received at the first property.

For example, a parsing rule associated with the second operation can be generated for the first command input. Then, at a later time, when first command input is received at the search engine property, the search engine can cause a service at the second resource property to perform the second operation and provide the data generated in response to the second operation in addition to the data provided in response to a search operation.

Figure 1:
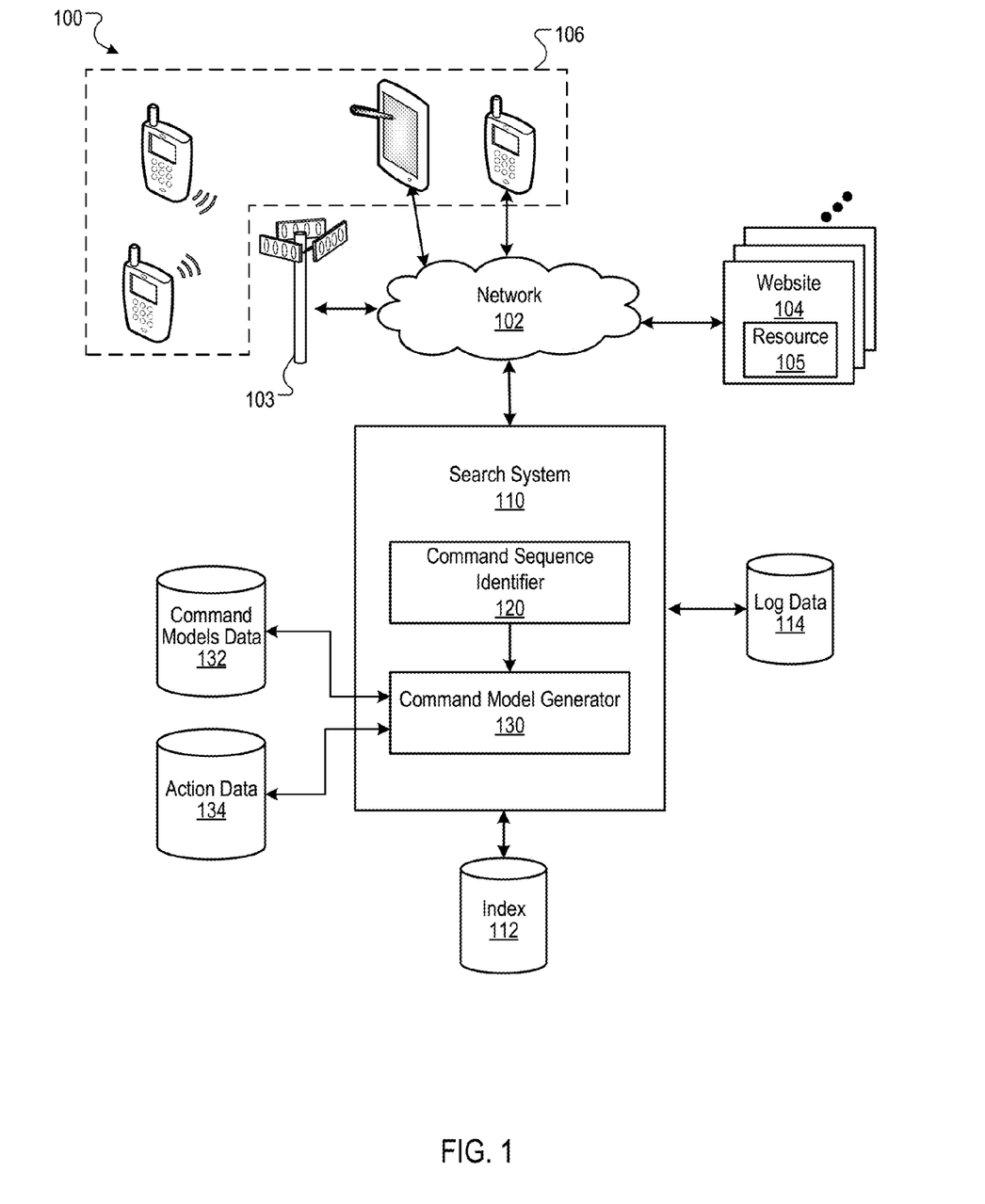
FIG. 1 is a block diagram of an environment in which log data are processed to facilitate inducing command inputs from property sequences.

FIG. 1 is a block diagram of an environment in which the command models for corresponding actions are utilized. A computer network 102, such as a local area network (LAN), wide area network (WAN), the Internet, or a combination thereof, provides for data communication between electronic devices and systems. Examples of such electronic device and systems include web sites 104 and user devices 106. The computer network 102 may also be included, or be in data communication with, one or more wireless networks 103.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. A resource 105 is any data that can be provided by the website 104 over the network 102 and that is associated with a resource address.

The websites 104 may also provide data for a specific corpus type. For example, a particular website may provide images; another website may provide book related data; another website may provide map services, and the like.

A user device 106 is an electronic device that is capable of requesting and receiving resources over the network 102, establishing communication channels, e.g., voice communications, with other user devices 106, and also capable of performing other actions. Example user devices 106 include personal computers, mobile communication devices, and other devices that can send and receive data over the network 102. The user devices 106 may communicate over the networks 102 and 103 by means of wired and wireless connections.

To facilitate searching of these resources 105, the search system 110 identifies the resources by crawling the publisher websites 104 and indexing the resources provided by the publisher websites 104. The resources are indexed and the index data are stored in an index 112. Although the index 112 is depicted as a single entity, it can include multiple parts and different indexes. Furthermore, as described above, multiple corpora each of a different content type, can be indexed.

The user devices 106 submit search queries to the search system 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search system 110, or some other identifier that identifies the user device 106 or the user using the user device.

In response to the search request, the search system 110 uses the index 112 to identify resources that are relevant to the queries. The search system 110 identifies the resources in the form of search results and returns the search results to the user devices 106 in search results page resource. A search result is data generated by the search system 110 that identifies a resource or provides information that satisfies a particular search query, which is a command input for the search system 110.

The search results are ranked based on scores related to the resources identified by the search results. The scores can differ based on the corpus searched. For example, for a web corpus, the scores can be based on information retrieval ("IR") scores, and optionally a separate ranking of each resource relative to other resources (e.g., an authority score). For an image search, the scores can be based on a selection rate of the image and the relevance of label terms to the query. Other scoring schemes are used for other corpora. The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the command inputs of user devices 106 are stored in log data 114. The log data 114 stores data defining device sessions, command inputs received during the sessions, and actions taken in response to the command inputs. As used in this description, a device session, or simply a session, is defined by one or more command inputs that are received and grouped together to indicate they occurred during a session. The session can be defined by a variety of appropriate ways. For example, a session may be a set of command inputs received during a predefined time period, e.g., 30 minutes; or may be up to N inputs, e.g., up to 50 inputs; or may be a period during which a user maintained interactions with the user device until an inactivity time out (e.g., five minutes) occurred. Other appropriate criteria to define a session can also be used.

For each command input, the log data 114 also stores data describing actions taken in response to the command input. The data describing actions taken in response to the command input can be, for example, data describing service requests and parameters passed to the service; and actions taken at the user device, such as the selection of search results; etc. Furthermore, some of the command inputs may not directly result in action performed by the user device. This may be the result of a command input not being parsed by rule associated with an action, or being parsed by a rule associated with an action that is not an action the user desires, or for some other reason.

The log data 114 also indicates, for each session, the sequence of command inputs. Ordinal positions of the command inputs for each session can be defined by timestamps, sequence values, or other appropriate data that can be used to derive an ordinal position of a command input relative to other command inputs for a session. The log data 114 can thus be used to determine the respective sequences of command inputs submitted by the user devices, the actions taken in response to the command inputs, and how often the command inputs have been submitted.

As used in this specification, "command input" or "command input sentence" can be an input sentence, a query, or any other input that has one or more terms. The input does not need to be a grammatically correct and complete sentence, e.g., it need not have both a predicate and a subject. For example, the following input would constitute a command input, but would not constitute a grammatically complete sentence: "Images of lions." A command input need not have an associated parsing rule, nor have annotations or other data describing terms of the command input. The language processing system, in some implementations, can process command inputs to generate a parsing rule and provide such annotations. In general, any input of one or more terms can be a command input, regardless of whether the particular command input is associated with other language processing data, such as parsing rules, parts of speech tagging, etc.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In some implementations, the search system 110 may be able to perform language processing on received queries. The results of the language processing are associated with particular actions. For example, a query, which may be interpreted as a potential command input that may invoke a particular action, may be parsed by parsing rules stored in command models data 132. The command models data 132 associates' actions with corresponding command models by use of parsing rules, such as grammars. The command models data 132 store command models for actions specified by action data 134, and are generated by the command model generator 130.

The search system 110 may interpret every received query as a command input, and depending on the parsing result, may perform a web search, and also perform an additional operation (or cause another system to perform the additional operation and provide the resulting information to the search system 110, which then, in turn, provides the resulting information with the search results), or may only perform the additional operation in lieu of a search operation.

Some command inputs, however, may not result in a successful parse by a parsing rule. This may be due to the fact that there are many ways users can express an informational need, and not all of those ways can be anticipated a priori. For example, a user may desire a map route for driving from San Francisco to Atlanta, and thus may speak the following input into a user device: [route me from San Francisco to Atlanta]. The user device, using a speech to text process, converts the voice input in the corresponding textual query and sends the query to the search system 110. The search system 110 then accesses command models data 132 to parse the command inputs. Assume that there is no parsing rule that successfully parses the command input [route me from San Francisco to Atlanta]. As a result, the search system 110 processes the input as a standard web query, searches the index 112 for webpages that are responsive to the query, and provides search results to the user device that submitted the query.

The search results that are provided, however, do not include a map route from San Francisco to Atlanta. The user thus does not select any of the search results, and instead navigates to another property—a map serving web site and inputs a starting parameter value of "San Francisco" and destination parameter value of "Atlanta." The map service provides the route to the user device. At the user device, the user takes an action indicating satisfaction of his or her informational need, such as e-mailing the route to an e-mail account, bookmarking the route, or printing the route.

Similar signals derived from command input sequences may occur for other resource properties as well. For example, a user may provide the input [Give me a list of books John Steinbeck wrote]. Assume the query is not parsed by a parsing rule associated with a book corpus search for books authored by a particular author, and the user is dissatisfied with the search results provided, e.g., the user selects only a few search results, each resulting in a "short click," in which the user navigates back to the search results page. The user then searches a book corpus from using the author's name as the search parameter, and receives a listing of titles authored by John Steinbeck. The user then takes actions indicating user satisfaction (e.g., browsing the titles, saving the list, etc.).

The users in both situations above exhibit a parallel behavior—their actions express dissatisfaction for data provided in response to a first operation for a first resource property, followed by actions that express satisfaction for data provided in response to a second operation for a second resource property. Provided there is sufficient co-occurrence for similar pairs of command inputs, the behavior is a signal that a command input for a first operation at a property will not satisfy a user's information need, but a similar command input for a second operation for a second property will.

Thus, in some implementations, a command sequence identifier 120 is used to mine the log data 114 and identifier command input pairs of first and second command inputs. From these command input pairs, command inputs for which parsing rules are to be generated are identified. Operation of the command sequence identifier 120, in combination with other subsystems, is describe with reference to FIG. 2, a flow diagram of an example process 200 for inducing command inputs from property sequences. The process 200 can be implemented in a data processing apparatus of one or more computers programmed to carry out the operations described below.

Figure 2:
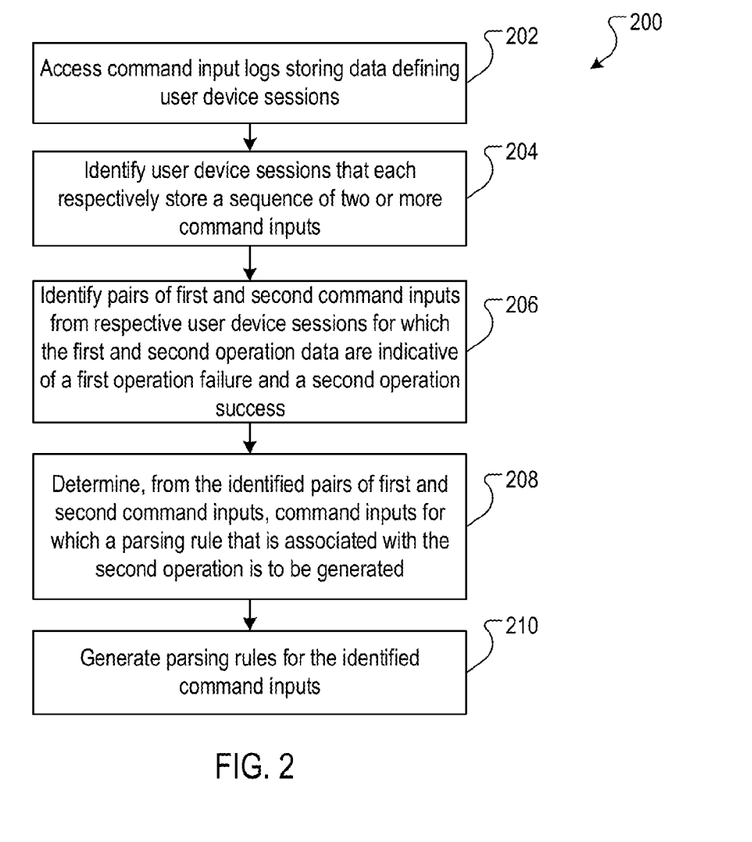
FIG. 2 is a flow diagram of an example process for inducing command inputs from property sequences.

The command sequence identifier 120 accesses command input logs storing data defining user device sessions (202). For example, the command sequence identifier 120 accesses the log data 114. The log data 114 store data defining user device sessions, as described above.

The command sequence identifier 120 identifies user device sessions that each respectively store a sequence of two or more command inputs (204). For example, as described above, the logs store data for each user device. The sessions may be identified in a variety of ways, and is defined by one or more command inputs that are received and grouped together to indicate they occurred during a session. A session may be a set of command inputs received during a predefined time period, e.g., 30 minutes; or may be up to N command inputs, e.g., up to 50 inputs; or may be a period during which a user maintained interactions with the user device until an inactivity time out (e.g., five minutes) occurred. Other appropriate criteria to define a session can also be used. Only the sessions that have at least two or more command inputs are identified.

Each command input specifies one or more parameter values, and each command input has a respective ordinal position in the sequence. Thus a sequence of two or more command inputs includes at least one pair of a first command input that precedes a second command input in ordinal position in the sequence.

The command sequence identifier 120 identifies pairs of first and second command inputs from respective user device sessions for which the first and second operation data are indicative of a first operation failure and a second operation success (206). For example, the command sequence identifier 120 identifies sequence of two or more command inputs for which the first command input has associated first operation data indicating a first operation performed on data from a first resource property in response to the first command input, and second operation data indicating a second operation performed on data from a second resource property in response to the second command input. As described above, a variety of appropriate heuristics can be used to determine whether an operation failure or success occurred. The heuristic are indicative of satisfaction of a user's informational need.

To illustrate, assume a session has three sequences of command inputs: [Atlanta Aquarium] for the search system 110 resource property (e.g., the search system 110 webpage), [get me flights from San Francisco to Atlanta] for the search system 110 resource property, and the command input in the form of input parameters [ORIGIN: SFO; DESTINATION: ATL] for a flight booking resource property. The command inputs [Atlanta Aquarium] and [get me flights from San Francisco to Atlanta] cannot constitute a pair of first and second command inputs because both resulted in an operation (a search of a web index) for the same resource property (the search engine webpage). However, the command inputs [get me flights from San Francisco to Atlanta] and [ORIGIN: SFO; DESTINATION: ATL] potentially constitute a pair because the first command input is for a search engine property and the second command input is for a flight booking property, which is different from the search engine property.

The command inputs [get me flights from San Francisco to Atlanta] and [ORIGIN: SFO; DESTINATION: ATL] "potentially" constitute a pair because they must also be associated with first and second operation data that are respectively indicative of a first operation failure and a second operation success. Assume, for example, that the user did not select any search results provided for the search operation in response to the query [get me flights from San Francisco to Atlanta], and data descriptive of the user's interactions are stored in the log data 114. The command sequence identifier 120, using an appropriate heuristic, will interpret this as an operation failure.

Also assume that the user did select additional pages and booking options on the flight booking resource property in response to flight data provided in response to the command input [ORIGIN: SFO; DESTINATION: ATL], and data descriptive of the user's interactions are stored in the log data 114. The command sequence identifier 120, using the appropriate heuristic, will interpret this as an operation success. Accordingly, the command inputs [get me flights from San Francisco to Atlanta] and [ORIGIN: SFO; DESTINATION: ATL] are identified as a pair of command inputs.

In some implementations, the command sequence identifier 120 processes only command inputs that are in incremental ordinal sequence and does not process potential pairs of command inputs that have an intervening command input. For example, [Atlanta Aquarium] and [ORIGIN: SFO; DESTINATION: ATL] cannot constitute a pair of command inputs because the command input [get me flights from San Francisco to Atlanta] is intervening.

However, in other implementations, intervening command inputs can be ignored, and thus the command inputs [Atlanta Aquarium] and [ORIGIN: SFO; DESTINATION: ATL] may potentially constitute a pair. Now assume that several search results provided in response to the command input [Atlanta Aquarium] were selected at the user device, and the selections indicate the user spent more than a threshold amount of time on the corresponding resources referenced by the search results so that the selections are not considered to be "short clicks." The command sequence identifier 120, using the appropriate heuristic, will interpret this as an operation success. Accordingly, the command inputs [Atlanta Aquarium] and [ORIGIN: SFO; DESTINATION: ATL] cannot constitute a pair of command inputs because both are associated with operation successes.

The heuristics above are just two examples of identifying command input pairs. Additional heuristics are described with respect to FIGS. 3 and 4 below.

The command sequence identifier 120 determines, from the identified pairs of first and second command inputs, command inputs for which a parsing rule that is associated with the second operation is to be generated (208). For example, for the identified pairs of command inputs, the first command inputs are selected for the generation of parsing rules. This is because the first command inputs are associated with operation failures, while the respective second command inputs are associated with operation successes. Accordingly, in some implementations, a parsing rule that is associated with the second operation is to be generated from the first command inputs of the identified pairs of first and second command inputs.

The process 200 generates parsing rules for the identified command input (210). For example, for the pair of command inputs [get me flights from San Francisco to Atlanta] and [ORIGIN: SFO; DESTINATION: ATL], a parsing rule for [get me flights from San Francisco to Atlanta] will be generated and associated with an action that causes the operation of the second command input to be performed. The parsing rules, in some implementations, can be manually generated by system administrators.

In other implementations, a command model generator 130 can be a machine learned process or manually tuned process that generates parsing rules for second operations for the first command inputs. The command model generator 130 can utilize a set of machine learned processes, each tuned for a particular operation. The parsing rules so generated are configured to determine from the first command inputs parameter values for submission as input for a particular operation with which they are associated. For example, for a search of the flight booking property, the command model generator 130 may associate with the parsing rule an action that causes an agent or device to submit a query to the flight booking property that includes an origin value and destination value. The origin values and destination values, for example, are city codes.

In some implementations, the parsing rules are grammar based rules. For example, a grammar is generated for the above four sentences in the form:

G=<T, N, S, R>;
where:
T={get, me, flights, from, to}
N={_ORG, _DEST}
S=S
R={
S→4 get me flights from <_ORG> to <_DEST>
_ORG, _DEST→<City List>
}: Q_FLT[ORIGIN: Map(_ORG); DESTINATION: Map (_DEST)]

For the non-terminals _ORG and _DEST, city names from a city list are used. The pseudo-code after the colon indicates that upon a successful parse of an input sentence, an input query for the flight booking property will be generated. The city codes are obtained by a mapping function Map(*) that maps an input * to a corresponding city code. Thus, any sentence of the form:

get me flights from <_ORG> to <_DEST> will successfully parse to the newly generated rule. Because the rule is associated with a query input action, a successful parse either at a user device or processed at a server, will cause the parsing system to submit the flight query.

There will be many times that a sequence of command inputs may be potential pairs. As described above, various heuristics can be used to determine if command inputs should be classified as pairs. Two additional examples are described with reference to FIGS. 3 and 4 below.

Figure 3:
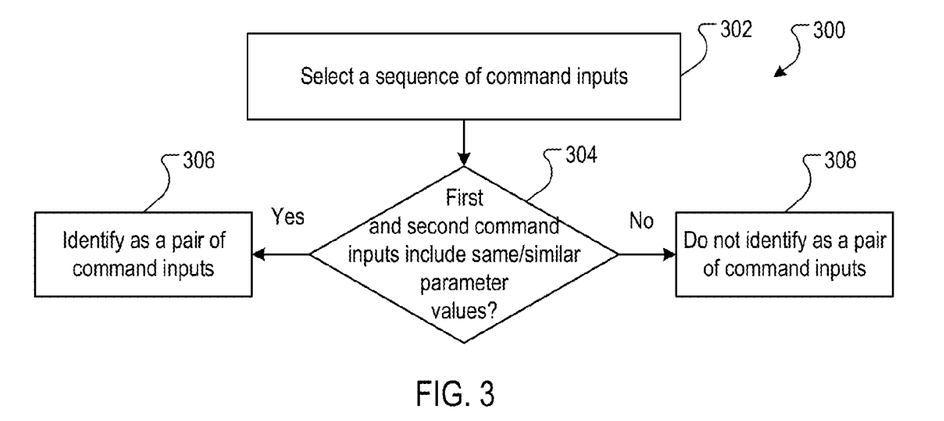
FIG. 3 is a flow diagram of an example process for identifying a pair of command inputs.

FIG. 3 is a flow diagram of an example process 300 for identifying a pair of command inputs. The process 300 can be implemented in a data processing apparatus of one or more computers programmed to carry out the operations described below. The process 300 specifies an additional heuristic that requires similar parameter values to be in both command inputs. This heuristic is based on the assumption that should an operation fail to satisfy a person's informational need, the subsequent operation will include, as input, parameters that are the same or very similar to the parameters input to the first operation.

The command sequence identifier 120 selects a sequence of command inputs (302). As described above, the command sequence identifier 120 may identify a sequence of command inputs 302, the first associated with an operation failure, and the second associated with an operation success.

The command sequence identifier 120 determines whether the first and second command inputs include same or similar parameter values (304). For example, the first and second command inputs can be parsed and the resulting terms or token are analyzed for entity detection. In some implementations, parameter types and values of entity types are identified. For example, for the command input pair [get me flights from San Francisco to Atlanta] and [ORIGIN: SFO; DESTINATION: ATL], entity detection would yield two entity city types in each command input, as the entities of San Francisco and Atlanta are clearly specified in both command inputs. Furthermore, both command inputs include the same or similar values: San Francisco and SFO, and Atlanta and ATL.

If the first and second command inputs include the same or similar parameter values, then the command sequence identifier 120 identifies the sequence of command inputs as a pair of command inputs (306). For example, because the same entity types are included, the command inputs are identified as a command input pair. Conversely, if the first and second command inputs do not include the same or similar parameter values, then the command sequence identifier 120 does not identify the sequence of command inputs as a pair of command inputs (308).

Figure 4:
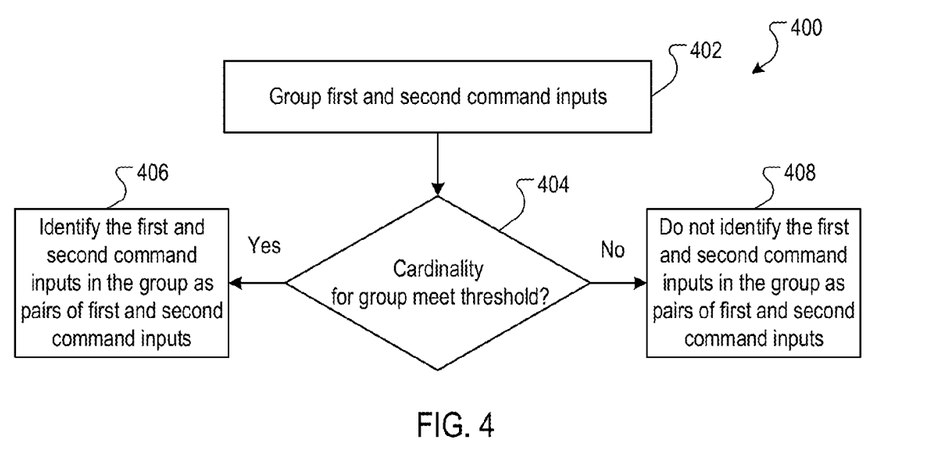
FIG. 4 is a flow diagram of an example process for generating groups of pairs of command inputs.

FIG. 4 is a flow diagram of an example process 300 for generating groups of pairs of command inputs. The process 400 can be implemented in a data processing apparatus of one or more computers programmed to carry out the operations described below. The process 300 specifies an additional heuristic groups first and second command inputs and, for each group, determines a cardinality to ensure that resulting command input pairs meet a co-occurrence requirement.

The command sequence identifier 120 groups the first and second command inputs (402). As described above, the command sequence identifier 120 may identify a sequence of command inputs, the first associated with an operation failure, and the second associated with an operation success. The potential pairs are then grouped together. A variety of appropriate grouping criteria can be used. For example, one grouping criteria may require that all first and second command inputs for a group include the same parameter types. Another grouping criteria may require a similarity threshold for all first command inputs belonging to the group be met, such as each first command input being similar in structure and terms used. Other appropriate grouping criteria can also be used.

The command sequence identifier 120 determines if the cardinality of the group meets a threshold (404). The cardinality threshold is selected to ensure that the co-occurrence of first and second command input sequences are statistically significant. The cardinality threshold can be set by system administrator or can vary based on the amount of log data available. A variety of appropriate statistical analysis techniques can be used to select the cardinality threshold.

If the cardinality of the group meets the threshold, then the command sequence identifier 120 identifies the first and second command inputs in the group as pairs of first and second command inputs (406). Conversely, if the cardinality of the group does not meet the threshold, then the command sequence identifier 120 does not identify the first and second command inputs in the group as pairs of first and second command inputs (408).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method performed by a data processing apparatus, the method comprising:
   accessing command input logs storing data defining user device sessions;
   identifying, from the command input logs, user device sessions that each respectively store:
   a first command input for a first operation;
   a second command input subsequent to the first command input and for a second operation and wherein the second command input is determined to be similar to the first command input;
   first operation data indicating a failure to satisfy an user's informational need by the first operation performed on data from a first resource corpus in response to the first command input;
   second operation data indicating success in satisfying the user's informational need by the second operation performed on data from a second resource corpus in response to the second command input, wherein the second resource corpus is of a corpus type that is different from a corpus type of the first resource corpus; and
   determining, from the first and second command inputs, command inputs for which a parsing rule that is associated with the second operation is to be generated.

2. The computer-implemented method of claim 1, the second command input is determined to be similar to the first command input based on the first command input including a parameter value specified by a user and the second command input including the same parameter value specified by the user.

3. The computer-implemented method of claim 1, the second command input is determined to be similar to the first command input based on the first command input including a first parameter value of a parameter type specified by a user and the second command input including the a second parameter value of the same parameter type specified by the user, where the second parameter value is different from the first parameter value.

4. The computer-implemented method of claim 1, wherein determining command inputs for which a parsing rule that is associated with the second operation is to be generated comprises determining a parsing rule that is associated with the second operation is to be generated from the first command inputs.

5. The computer-implemented method of claim 1, wherein the parsing rule is a grammar based rule.

6. The computer-implemented method of claim 1, wherein the first command inputs are generated from voice command inputs.

7. The computer-implemented method of claim 1, wherein the first resource corpus is a search engine corpus for searching a plurality of corpora and the second resource corpus is a resource corpus that is different from the search engine corpus.

8. A non-transitory computer readable storage medium storing instructions executable by a data processing apparatus and that upon such execution causes the data processing apparatus to perform operations comprising:
   accessing command input logs storing data defining user device sessions;
   identifying, from the command input logs, user device sessions that each respectively store:
   a first command input for a first operation;
   a second command input subsequent to the first command input and for a second operation and wherein the second command input is determined to be similar to the first command input;
   first operation data indicating a failure to satisfy an user's informational need by the first operation performed on data from a first resource corpus in response to the first command input;
   second operation data indicating success in satisfying the user's informational need by the second operation performed on data from a second resource corpus in response to the second command input, wherein the second resource corpus is of a corpus type that is different from a corpus type of the first resource corpus; and
   determining, from the first and second command inputs, command inputs for which a parsing rule that is associated with the second operation is to be generated.

9. The non-transitory computer readable storage medium of claim 8, the second command input is determined to be similar to the first command input based on the first command input including a parameter value specified by a user and the second command input including the same parameter value specified by the user.

10. The non-transitory computer readable storage medium of claim 8, the second command input is determined to be similar to the first command input based on the first command input including a first parameter value of a parameter type specified by a user and the second command input including the a second parameter value of the same parameter type specified by the user, where the second parameter value is different from the first parameter value.

11. The non-transitory computer readable storage medium of claim 8, wherein determining command inputs for which a parsing rule that is associated with the second operation is to be generated comprises determining a parsing rule that is associated with the second operation is to be generated from the first command inputs.

12. The non-transitory computer readable storage medium of claim 8, wherein the parsing rule is a grammar based rule.

13. The non-transitory computer readable storage medium of claim 8, wherein the first command inputs are generated from voice command inputs.

14. The non-transitory computer readable storage medium of claim 8, wherein the first resource corpus is a search engine corpus for searching a plurality of corpora and the second resource corpus is a resource corpus that is different from the search engine corpus.

15. A system, comprising:
    a data processing apparatus; and
    a non-transitory computer readable storage medium in data communication with the data processing apparatus storing instructions executable by the data processing apparatus and that upon such execution causes the data processing apparatus to perform operations comprising:
    identifying, from the command input logs, user device sessions that each respectively store:
    a first command input for a first operation;
    a second command input subsequent to the first command input and for a second operation and wherein the second command input is determined to be similar to the first command input;
    first operation data indicating a failure to satisfy an user's informational need by the first operation performed on data from a first resource corpus in response to the first command input;
    second operation data indicating success in satisfying the user's informational need by the second operation performed on data from a second resource corpus in response to the second command input, wherein the second resource corpus is of a corpus type that is different from a corpus type of the first resource corpus; and
    determining, from the first and second command inputs, command inputs for which a parsing rule that is associated with the second operation is to be generated.

* * * * *